United States Patent [19]
Derdowski et al.

[11] 3,816,697
[45] June 11, 1974

[54] SHEET THICKNESS DETECTOR AND ATTACHMENT LOCATOR

[75] Inventors: Ronald A. Derdowski, Bay City; Don S. Hayner, Hampton Twp., Bay County; Frank S. Parker, Bay City, all of Mich.

[73] Assignee: Newcor, Inc., Bay City, Mich.

[22] Filed: Oct. 16, 1972

[21] Appl. No.: 297,884

[52] U.S. Cl. .......... 219/107, 198/33 R, 198/33 AC, 198/232, 219/80, 219/103
[51] Int. Cl. ...................... B23k 11/10, H01m 3/16
[58] Field of Search ............... 219/107, 80, 79, 103; 198/33 R, 33 AC, 232

[56] References Cited
UNITED STATES PATENTS
3,553,419  1/1971  Garver et al. ..................... 219/79 X

*Primary Examiner*—J. V. Truhe
*Assistant Examiner*—Hugh D. Jaeger
*Attorney, Agent, or Firm*—Woodhams, Blanchard and Flynn

[57] ABSTRACT

A manufacturing system applicable to seam welded metal containers for the fastening of attachments thereto in a predetermined relationship to the seam. The container is supported upon suitable means for rotating same about its longitudinal axis and a mechanically actuated feeler switch is arranged thereagainst for responding to the increased thickness of material in the location of the seam and delivering a signal. Said signal initiates a timer control which stops the rotation of the container at a predetermined angular spacing from the seam and initiates the attaching operation which latter may occur in the same or at a subsequent station.

14 Claims, 8 Drawing Figures

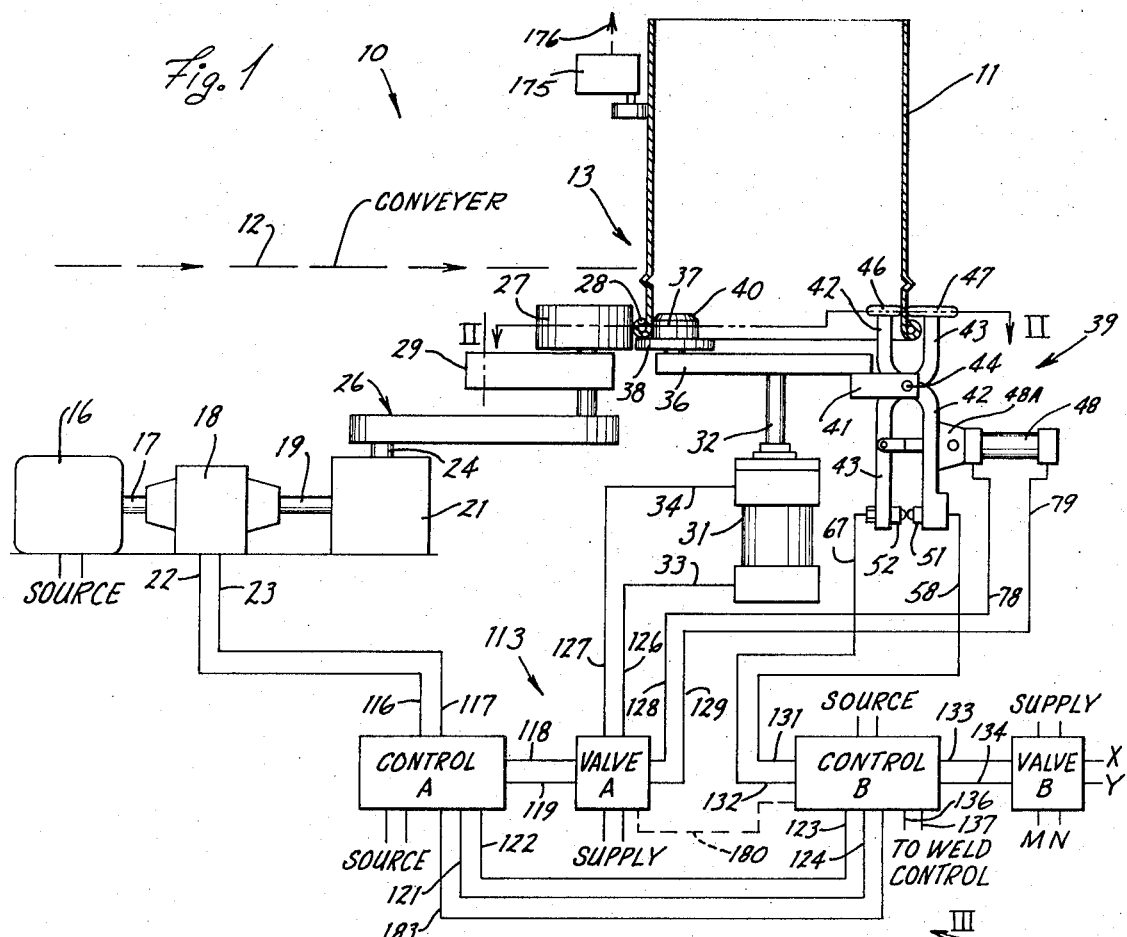

SHEET THICKNESS DETECTOR AND ATTACHMENT LOCATOR

FIELD OF THE INVENTION

This invention relates to a system applicable in the manufacture of seam welded containers for the fastening of attachments thereto, such as the fastening of ears onto a pail, at a predetermined angular spacing from the seam of such container. More particularly, means are provided for responding to the greater thickness at the seam of the container and locating the attaching operation at a predetermined angular spacing therefrom.

BACKGROUND OF THE INVENTION

This invention arose out of a problem existing in the manufacture of seam welded steel pails and hence the following discussion, both as to background and as to the specific embodiment herein disclosed for illustrative purposes, will be set forth in terms of a pail manufacturing system. However, it will be recognized that both the problems and the means employed for dealing therewith have applicability in other areas besides the manufacture of pails and hence it will be understood that the invention is broader than the specific embodiment herein described and will be recognized as applicable accordingly.

Turning now to the specific problem out of which the present invention arose, there has long existed a problem in the manufacture of steel pails of accurately but automatically locating a suitable point on the previously welded cylinder for the attachment of the parts, termed "ears" in the trade, by which the bail of the pail is connected to the pail body. There is, of course, a wide range of possible locations which are entirely acceptable but it is obvious that whatever system is used must be capable of sensing the location of the seam and avoid same in placing and welding the ear to the pail body.

In the common method of manufacturing pails and other generally similar containers it is and for many years has been normal practice to bend a sheet of weldable material into a cylinder, overlap same, and weld the overlapped portions together, such as by a seam welding operation. Subsequent to this operation, the ears are fastened thereto.

In earlier methods for the manufacture of pails, the location, placement and welding of the ears to the pail was done at least semi-manually so that the location thereof with respect to the seam presented no real problem. However, for at least the past 20 or 25 years the industry has been continuously endeavoring to reduce its cost by providing automatic means for locating and welding said ears to pail bodies and a great deal of effort has been expended in this direction.

Previous attempts to solve this problem have included the provision of visible markings on the pail and their interpretation by photosensitive electrical means, but this has been both expensive and not completely accurate inasmuch as it both required and depended upon an intermediate step of properly affixing such markings. Another approach has been to punch holes, or at least depressions, in the pail material adjacent the weld line but this again requires an intermediate operation with its expense and possibility for malfunctioning.

In addition a variety of other mechanical, or partly mechanical indicators or sensors have been investigated but all of these have been commercially unacceptable for a variety of reasons. Some were insufficiently sensitive, some were mechanically too complex and some though sensitive insufficiently reliable to be commercially acceptable.

In addition to the foregoing difficulties, systems which have depended on light reflectivity or pattern appearance, such as the systems mentioned above, present further difficulties where the seam is somewhat obliterated by a planishing operation.

Therefore, the objects of the invention include:

1. To provide a procedure and system useful in the manufacture of products from sheet material for sensing a variation in said material from a given norm and for utilizing such sensing to produce a signal.

2. To provide a system, as aforesaid, which will sense a slight thickening of the metal from such a predetermined norm and will produce a signal as a result thereof.

3. To provide a system, as aforesaid, which will sense the presence of a welded seam, even after planishing thereof, and which will provide a signal of such sensing.

4. To provide a procedure and system which is particularly useful in the manufacture of seamed containers for the fastening of attachments thereto in a predetermined location with respect to the seam.

5. To provide simple mechanical means for locating the position of a seam without the need for intermediate steps and thereupon bringing about an attachment fastening operation.

6. To provide a procedure and system, as aforesaid, which will be particularly effective for the welding of ears onto seam welded pails.

7. To provide a procedure and system, as aforesaid, in which the seam can be accurately located even after it has been at least partially obliterated, at least visually, by planishing or other smoothing operation.

8. To provide a system, as aforesaid, which can be implemented by the use of only simple mechanical equipment but which will nevertheless have a high level of both accuracy in operation and freedom from maintenance.

Other objects and purposes of the invention will be apparent to persons acquainted with apparatuses of this general type upon reading the following specification and inspecting the accompanying drawings.

BRIEF DESCRIPTION OF THE DRAWINGS

In the drawings:

FIG. 1 is a schematic view of the apparatus for carrying out the invention as seen in side elevation;

FIG. 2 is a sectional view taken along the line II—II of FIG. 1;

FIG. 3 is a side elevation of the ear supplying and welding portion of the apparatus, the same being located substantially as indicated by the line III—III in FIG. 2;

SUMMARY OF THE INVENTION

Figure 5:
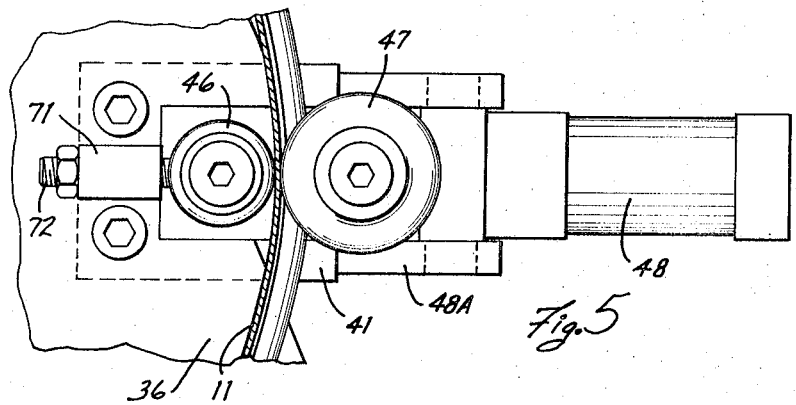
FIG. 5 is a fragmentary sectional view substantially taken on the line IV—IV of FIG. 4.

In carrying out the objects and purposes above set forth, and with reference to the herein disclosed embodiment, there is provided means for receiving the seam welded cylinder which when finished will constitute the pail body and for causing same to rotate around its longitudinal axis. During such rotation a pair of rollers, carried by and adjacent one end of a scissors-like sensing device, run opposite each other against the inside and outside surfaces of the cylinder and switch contact elements are carried by and adjacent the other end of the sensing device. When said rollers cross the seam they will separate slightly in response to the increase in thickness at the seam, so as to separate the switch contact elements. This produces a signal which can be utilized first to stop the rotation at the proper point to orient the cylinder, next to feed the desired attachment to the proper place on the cylinder and then weld same into position. The orienting, feeding and welding may, insofar as the present invention is concerned, be carried out at the same station or at multiple stations as desired. The sensing device is sufficiently sensitive to the thickness of the cylinder as to sense the location of the seam even after same has been substantially smoothed as by a planishing operation.

DETAILED DESCRIPTION

Referring now in more detail to the drawings, the system 10 by which an attachment is weldably secured to an elongated and hollow workpiece 11, here a cylinder, comprises a conveyor 12 schematically illustrated by broken lines for conveying the hollow workpieces to an orientation and welding station 13. Each workpiece 11 has a welded seam 14 (FIG. 2) thereon which extends longitudinally parallel to the axis thereof.

The orientation and welding operations are here assumed, for purposes of simplicity of illustration, to be carried out at a single station 13. However, it is contemplated, though considered less desirable, that these operations can be carried out at multiple stations if preferred. As here shown, the station 13 comprises a motor 16 having an output shaft 17 which is connected through a clutch and brake mechanism 18, shaft 19 to a gearbox 21. In this particular embodiment, the motor 16 is continuously running and the clutch and brake mechanism 18 is responsive to signals applied to a pair of input terminals 22 and 23 to either produce a rotating output on the shaft 19 or to brake the rotation of the output shaft 19. The output shaft 24 of the gearbox 21 is connected through any convenient drive mechanism, here a sprocket and chain drive mechanism 26, to a drive wheel 27. The drive wheel 27 is mounted for movement into and out of engagement with the workpiece 11, here the rolled rim 28 thereon, by means of a pivoted lever 29 schematically illustrated in FIG. 1. The drive wheel 27 is movable between the limits illustrated in broken and solid lines in FIG. 2.

The orientation and welding station 13 further comprises a power cylinder 31 having a rod 32 which is extendable and retractable in response to pressurized fluid applied to one of the input terminals 33 and 34. A plate 36 is secured to the end of the rod 32 and has a plurality of guide rollers 37 spaced thereon as indicated in FIG. 2. Each of the guide rollers 37 is rotatably secured to the plate 36 and has a radially outwardly extending flange 38 which engages the end surface of the rolled rim 28 on the workpiece 11. Each of the rollers 37 engages the internal surface of the workpiece 11 and one of the rollers engages the workpiece 11 on a side opposite the place of engagement of the drive roller 27 so that the pressure of the drive roller on the workpiece 11 will be offset by one of the guide rollers 37. Each of the guide rollers also has a chamfered upper edge 35 to facilitate movement of the guide rollers into the interior of the workpiece.

A sensing device 39 (FIGS. 1, 4, 5 and 6) for sensing a welded seam 14 is connected by a generally U-shaped bracket 41 (FIGS. 1 and 4) having a bight 41A pendently fixed to the plate 36. The sensing device 39 comprises a pair of arms 42 and 43 which cross each other and are pivotally connected to each other intermediate the longitudinal ends thereof by a pin 44 carried by and between the legs of the bracket 41, so as to define a scissors-like arrangement. The portions of the arms 42 and 43 below the pivot pin are preferably substantially greater than the length of the arms above such pivot. In the particular embodiment shown, the portion of the arms below the pivot pin 44 is approximately twice the length of the arm portions above such pivot pin. A roller element 46 is rotatably secured to the upper end of the arm 42. A roller element 47 is rotatably secured to the upper end of the arm 43 and is vertically and radially aligned with the roller element 46.

A pressure cylinder 48 suitably energized with an elastic fluid such as air is pivotally mounted at 49 by a bracket 48A onto one of the arms, here the arm 42, of the sensing device and the plunger 48B thereof is connected to the other arm, here the arm 43 through an axial extension 50 and pivot 50A. The cylinder 48 and extension 50 connect to the arms 42 and 43 intermediate the pivot 44 and the lower ends of said arms. Suitable pressures are applied as hereinafter discussed to the cylinder 48 for urging same continuously in a closing direction (retraction of the cylinder rod) to hold a constant resilient force urging the rollers 46 and 47 both constantly against the workpiece (as shown) during sensing and, alternatively, for extending the cylinder rod to shift said rollers away from each other so as to open a gap therebetween sufficient for the insertion and extraction of the workpiece into and out of the working position shown in FIG. 1.

A pair of switch contact elements 51 and 52 (FIG. 4) are secured to the arms 42 and 43, respectively, substantially at the lower ends thereof and are movable therewith into and out of engagement with each other. In this particular embodiment, the switch contact 51 comprises a hollow, internally threaded conductor member 53 axially movable in an opening 54 in the arm 42. A headed contact 57 threads into the inner end of the hollow conductor member 53. An adjustment member 55 is located against axial movement at the outer end of opening 54, has a threaded shank received in the outer end of the hollow member 53 whereby relative rotation therebetween axially adjusts the location of member 53 and contact 57. A conductor 58 has an eyelet attachment 59 secured by a screw 61 to the arm 42 adjacent and in electrically conductive relation with the conductor member 53 and contact 57.

The switch contact element 52 comprises a threaded conductor member 62 extending through an opening 63 in the arm 43 but is insulated from the arm 43 by an insulator 64. A contact head 66 is provided on one end of the threaded conductor member 62. In this particular embodiment, the threaded conductor member 62 is axially aligned with the threaded conductor member 53 so that the contact heads 57 and 66 will just contact one another to complete an electrical circuit when the wall thickness of the workpiece 11 is located between the roller elements 46 and 47. A conductor 67 having a conventional eyelet connector 68 secured thereto is connected to the threaded conductor member 62 by a nut 69.

In the preferred embodiment shown, the cylinder 48 and contact heads 57 and 66 are spaced from the pivot pin 44 respectively at distances equal to double the spacing of the rollers 46 and 47 from such a pivot pin. Hence, a given separation of the rollers 46 and 47, for example upon contacting a seam on the workpiece will result in a separation of the contact heads 57 and 66 of about double magnitude. Thus, even a relatively small change in thickness, for example, due to a heavily planished seam will result in a positive and conclusive separation of the contact heads 66 and 57 and positive termination of any current flow therebetween. On the other hand, forces exerted by the rollers 46 and 47 against the workpiece will tend to be the same or substantially the same as the force exerted by pressure fluid cylinder on the arms 42 and 43 to urge such arms toward each other, particularly as the contact heads 66 and 57 separate in response to contact by the rollers with the seam on the workpiece so that knowledge of the force exerted by the cylinder is a direct indication of the roller force on the workpiece. Such allows convenient presetting of the pressure to be applied to the conduit 78, setting the retract force on piston rod 48B. Pressure conduits 78 and 79 communicate with opposite ends of a cylinder 48 and are connected through suitable valve means to a pressure fluid supply as discussed further hereinafter.

The arms 42 and 43 in effect pivotally float on pin 44. Thus, irregularities in surface flatness, i.e., deviations in concentricity of portions of the workpiece wall with respect to the axis of workpiece rotation, not accompanied by significant increases in workpiece wall thickness, will not cause separation of the contact heads 66 and 57.

A block 71 is fixed atop plate 36 adjacent the upper end of the arm 42 and carries a threadedly adjustable stop screw 72 for adjustably limiting the pivotal movement of the top of the arm 42 away from the inner surface of the workpiece 11. Correspondingly, movement of the roller 47 away from the workpiece is limited by abutment of the lower portion of arm 43 with a bight 41A. The size of the resulting gap between the rollers 46 and 47, with the arms 42 and 43 in such open limiting position, is within the maximum length of stroke achievable by the cylinder 48 and the size and location of such gap are such as to allow free insertion or withdrawal of a workpiece between the thus spaced rollers 46 and 47.

The welding station portion 81 (FIG. 3) of the orientation and welding station 13 comprises a platform 82 which is pivotally secured to a fixed block 83 by a pivot pin 84. An arm 86 is secured to the platform 82 and extends upwardly therefrom and has a backup member 87 secured thereto adjacent the upper end thereof but insulated therefrom by an insulator 88. The rod 89 of a power cylinder 91 is pivotally connected to the platform 82 by a pivot pin 92. The power cylinder 91 is responsive to pressurized fluid applied to one of a pair of input terminals M and N to retract or extend the rod 89 to thereby pivot the platform 82 about the axis of the pivot pin 84.

A power cylinder 93 is connected to the platform 82 by a mounting bracket 94 so that a pivotal movement of the platform 82 will also effect a pivotal movement therewith of the power cylinder 93. The rod 96 of the power cylinder 93 has in this embodiment a pair of welding electrodes 97 and 98 (FIG. 6) secured thereto and electrically separated from each other in a conventional manner, as by an insulator 99. The power cylinder 93 is responsive to pressurized fluid applied to one of a pair of input terminals X and Y to retract or extend the rod 96 to move the welding electrodes toward or away from the workpiece 11. Each of the electrodes 97 and 98 is also insulated from the rod 96 of the power cylinder 93 by an insulator 101.

The welding electrodes 97 and 98 are connected in any convenient manner to the opposite terminals of a secondary winding 102 (FIG. 6) of a welding transformer 103. The welding transformer is supplied in any convenient and conventional manner from a source of electrical energy 104 controlled by a weld control 106.

Figure 6:
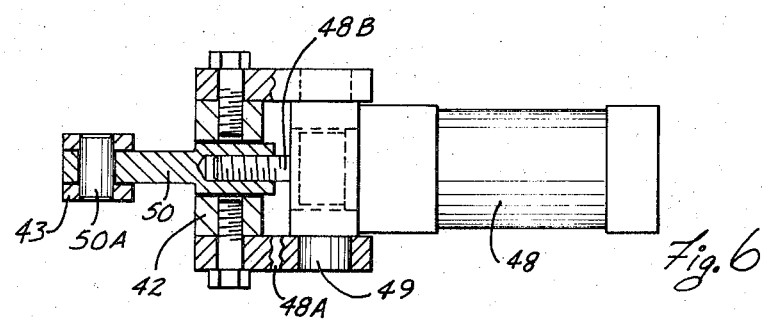
FIG. 6 is a fragmentary, partially broken sectional view substantially taken on the line VI—VI of FIG. 4.

A vibratory-type feeder 107 is provided for properly aligning and feeding an attachment W down a track 108 to a position of alignment with the welding electrodes 97 and 98 as illustrated in FIGS. 3 and 6. Thus, a movement of the welding electrodes 97 and 98 toward the backup member 87 will effect a clamping engagement of the attachment W between the welding electrodes 97 and 98 and the outer surface of the workpiece 11.

In this particular embodiment, the attachments W are ears to which the bail of a pail is to be attached when the workpiece is to become a pail. The attachments W comprise a pair of flanges 109 and 110 which engage the workpiece and are engaged by the welding electrodes 97 and 98, respectively, so that a passage of current through the welding electrodes will pass through the flanges 109 and 110 to effect a resistance weld of the attachments W to the workpiece 11. The attachments W also comprise a central portion 111 between the flanges 109 and 110 which is to be spaced from the workpiece 11. A pocket 112 is provided in the welding electrodes 97 and 98 for receiving the central portion 111 therein during a weld.

Control circuitry 113 (FIG. 1) is utilized to control and synchronize the operation of the system 10. The control circuitry 113 comprises a Control A of any convenient type having a pair of terminals 116 and 117 connected to the terminals 22 and 23 of the clutch and brake mechanism 18. The Control A also has a pair of terminals 118 and 119 connected to a valve A to control the actuation thereof. A pair of terminals 121 and 122 on the Control A are connected to terminals 123 and 124 to a Control B which will be discussed in more detail below. Controls A and B are also connected by a path 183 as discussed hereinafter. The Control A is supplied by any convenient source of electrical power.

The valve A may be of any convenient type supplied by a source of pressurized fluid. The terminals 126 and 127 of the valve A are connected to the terminals 33 and 34 of the power cylinder 31. The terminals 128 and 129 of the valve A are connected to the terminals 78 and 79 of the power cylinder 48. Valve A supplies a preselected pressure to the cylinder 48 to close the rollers 42 and 43 against the workpiece wall and hold same resiliently thereagainst during sensing and to reverse pressure fluid flow to the cylinder 48 for opening the rollers 42 and 43 during loading and unloading of the workpiece.

Figure 4:
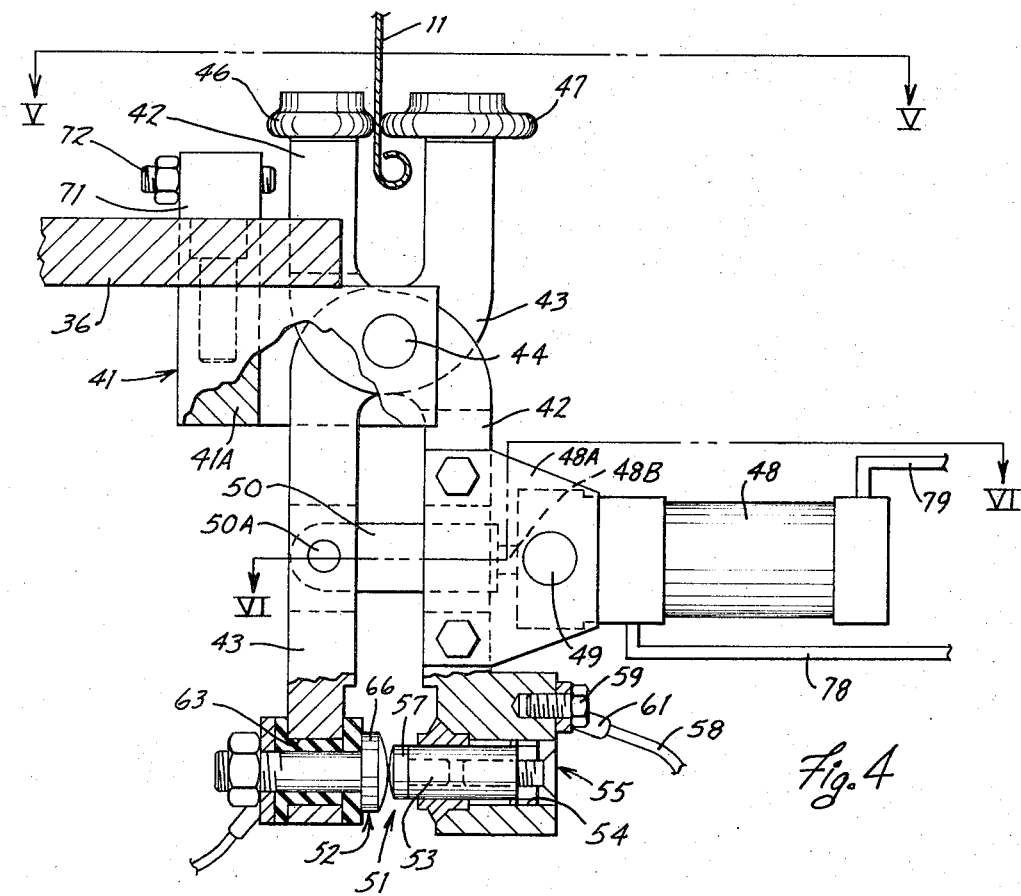
FIG. 4 is an enlarged detailed side view of the thickness sensing switch of FIG. 1.
Figure 7:
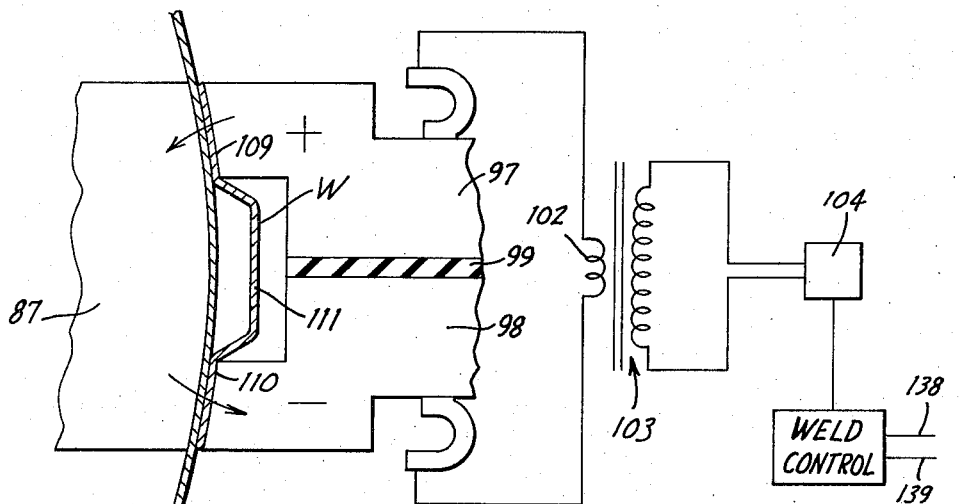
FIG. 7 is an enlarged sectional view substantially taken along the line VII—VII of FIG. 3 and including a schematic showing of the welding current supply.

The Control B has a pair of terminals 131 and 132 which are connected to the conductors 67 and 58 on the sensing device 39 illustrated in FIGS. 1 and 4. A pair of terminals 133 and 134 on the Control B are connected to a valve B for actuation thereof. The terminals M–N of the valve B are connected to the terminals M–N of the power cylinder 91. The terminals X–Y are connected to the terminals X–Y of the power cylinder 93. The valve B is supplied by any convenient source of pressurized fluid capable of operating the power cylinders 91 and 93. The terminals 136 and 137 of the Control B are connected to the terminals 138 and 139 (FIG. 7), respectively, of the weld control.

Figure 8:
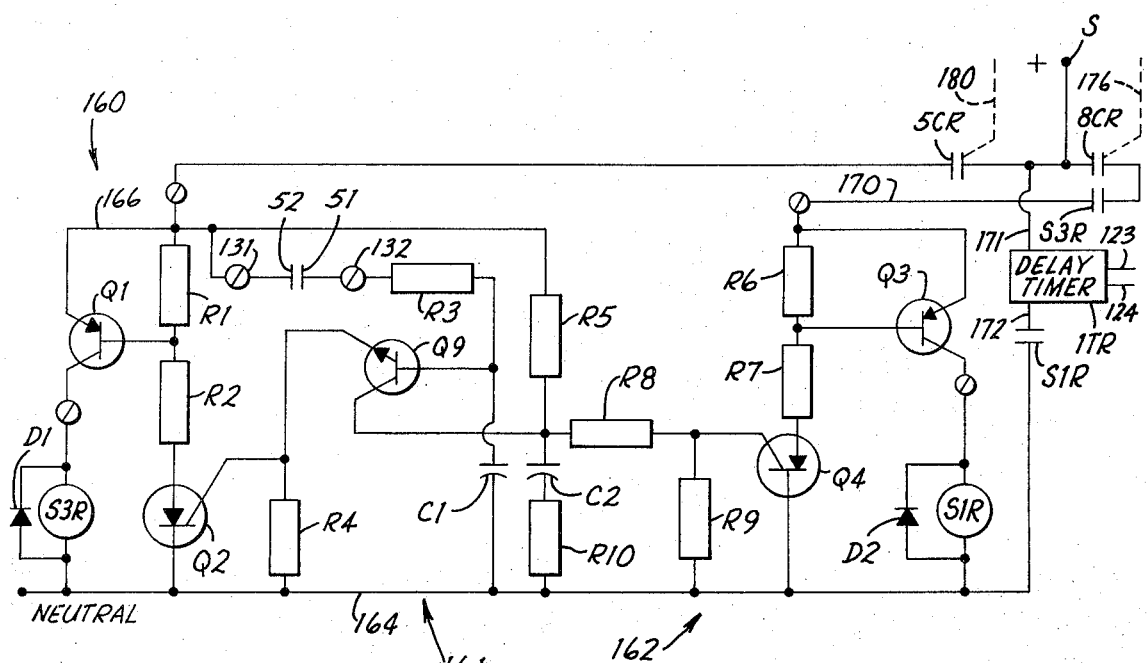
FIG. 8 is a circuit diagram of a portion of Control B of FIG. 1.

In the preferred embodiment shown, the Control B of FIG. 1 includes a sensing circuit 160 (FIG. 8). The sensing circuit 160 includes a sensor ready portion 161 and a detection portion 162. The sensor ready portion 161 comprises a neutral line 164 and a positive potential line 166 connected through a normally open contact 5CR, to a positive potential supply S. The contact 5CR is arranged to close as the rollers 46 and 47 of the sensing device 39 move into engagement with the wall of the workpiece 11. Such may, for example be carried out by rendering the contact 5CR open and closed, by any conventional means represented by broken line 180, in response to extension and retraction, respectively, of the cylinder 48 by the valve A.

The sensor ready portion 161 further includes a transistor Q1 connected in series with a relay S3R, paralleled by a diode D1, from the positive line 166 to the neutral line 164. A voltage divider comprising series resistors R1 and R2 connects with an SCR Q2 from the line 166 to the line 164, the base of transistor Q1 connecting between resistors R1 and R2. A series line comprising contacts 52 and 51, a resistor R3 and a capacitor C1 connects from line 166 to line 164.

A transistor Q9 connects at its base between resistor R3 and capacitor C1 and at its emitter to the gate of SCR Q2 and also through a resistor R4 to the neutral line 164. The collector of transistor Q9 connects through a resistor R5 to the positive line 166 and is the output line of the sensor ready portion 161.

The detection portion 162 comprises a positive potential line 170 which connects through a normally open contact S3R to the positive supply S above mentioned. Contact S3R is the contact of relay S3R above discussed with respect to portion 161. An SCR Q4 has its anode connected through a resistive voltage divider R6, R7 to the positive line 170 and its cathode connected to neutral line 164. The gate of SCR Q4 connects through a resistor R8 to the collector of transistor Q9 of the sensor ready portion 161. Gate bias is provided to the SCR Q4 through a resistor R9 connected to neutral line 164. An RC filter comprising a capacitor C2 and resistor R10 connected in series from the collector of transistor Q9 to the neutral line 164 prevents false triggering of the sensing control SCR Q4 from power supply transients.

The detection portion 162 further includes a transistor Q3 connected in series with 175 output relay S1R from the positive line 170 to neutral line 164. The base of transistor Q3 connects to the intermediate point of voltage divider R6, R7. A diode D2 parallels the relay S1R. A delay timer 1TR has a first power supply line 171 connected to the positive supply S and the other power supply line 172 thereof connects through the contact S1R, of relay S1R above-mentioned, to neutral line 164. The delay timer 1TR connects through lines 123 and 124 to the Control A. The timer 1TR is preferably a relatively precise timer arranged to ensure accurate stopping of the workpiece even when rotating at a relatively high speed.

A normally opened contact 8CR is preferably interposed between the contact S3R and the positive supply S so that actuation of the positive line 170 of the detection portion 162 requires closure of both the contacts 8CR and S3R. The contact 8CR is preferably, by any conventional means, such as a limit switch, responsive to rotation of the workpiece and a timing relay actuable thereby, schematically indicated at 17S (FIG. 7), made subject to completion of rotational acceleration of the workpiece up to a constant rotational speed before it is closed. The connection of the means 175 to the contact 8CR is represented by the broken line 176. Thus, the positive supply S would not be applied to the positive line 170 until the workpiece is accelerated to its normal rotational speed by the drive roller 27.

The synchronization of the Controls A and B, the valves A and B and the weld control 106 will be discussed in more detail in the operation section.

OPERATION

Although the operation of the system 10 described above will be understood from the foregoing description by skilled persons, a summary of such description is now given for convenience.

The hollow workpieces 11 are moved along a conveyor 12 after the longitudinal welded seam 14 has been added thereto and when the containers 11 reach the orientation and welding station 13, the Control A is activated by any convenient means (not illustrated) to energize the power cylinder 31 to drive the plate 36 upwardly so that the guide rollers 37 are positioned internally of the hollow workpiece 11 and the radial flanges 38 thereof engage the lower surface of the rolled rim 28. The chamfered edge 40 on the guide rollers 37 assists in centering the workpiece 11 on the guide rollers 37. The roller elements 46 and 47 on the arms 42 and 43 of the sensing device 39 are initially in the open, broken line position illustrated in FIG. 2 when the plate 36 is moved upwardly so that the rollers 46 and 47 will bypass the rolled rim 28. When the radial flanges 38 of the guide rollers 37 have engaged the rolled rim 28, the Control A energizes the valve A to actuate the power cylinder 48 with a constant preselected pressure to close the scissors arms 42 and 43, to the position illustrated in FIGS. 1 and 4, so as to hold the roller elements 46 and 47 in opposed engagement with the wall of the workpiece 11 with a preselected, resilient force. In such position of the sensing device, the contact heads 57 and 66 will touch each other, providing a completed electrical circuit from the conductor 58 to the conductor 67.

Upon closure of the roller elements 46 and 47 against the intervening wall of the workpiece 11, the Control A effects an energization of the clutch and brake mechanism 18 to move the drive roller 27 from the broken line position (FIG. 2) into the solid line position of engagement with the rolled rim 28 of the workpiece 11 to drive the workpiece 11 for rotation.

When the sensing device is thus clamped on the workpiece, valve A, through line 180, closes contact 5CR and D.C. power is applied to the sensor ready section 161 of sensing circuit 160 (FIG. 8) through such contact 5CR. Application of D.C. power from the positive source shown in FIG. 8 through contact 5CR to line 166 provides operating potential to transistors Q1 and Q9 and SCR Q2. On the other hand, closure of contacts 51 and 52 through their connection shown in FIG. 8 from positive line 166 through resistor R3 biases transistors Q9, SCR Q2 and transistor Q1 on, thereby operating relay S3R. Because the SCR Q2 will conduct until anode potential is removed therefrom, it provides a retentive memory that the sensing device contacts 51 and 52 are closed and that the sensing device is set up ready to start its detection sequence.

The provision of resistance R3 in the base circuit of transistor Q9 minimizes the effect of contact resistance, of contacts 51 and 52, on a total circuit resistance. The filter capacitor C1 assists in removing the affects of any contact bounce. The diode D1 across relay S3R prevents reverse voltages occurring when the relay de-energizes, as hereinafter discussed, from damaging its drive transistor Q1.

Closure of contact S3R, by now activated relay S3R will (ignoring for the moment contact 8CR, if such is present) provide power to the detection portion 162, energizing the positive line 170 thereof. However, both SCR Q4 and transistor Q3 are off at this point.

As the workpiece rotates and the wall thereof moves through the sensing rollers 46 and 47, the seam 14 of the workpiece will eventually pass between such rollers, its greater thickness forcing an increase in separation of such rollers and thereby an opening of, and separation of, contacts 51 and 52. Opening of the contacts 51 and 52, as seen in FIG. 8, shuts off transistor Q9 clamping the gate of SCR Q4 and allowing the potential of such gate to rise as a result of the resistors R5 and R8 connecting same to the positive line 166. The RC filter C2, R10, prevents false triggering of the SCR Q4 due to power line transients or the like but does not affect the reaction of SCR Q4 to the turn-off of transistor Q9. More particularly, the SCR Q4 triggers in response the aforementioned increase in its gate potential. Conduction through SCR Q4 turns on transistor Q3 which in turn conducts through, and thereby energizes, relay S1R closing the contact S1R thereof and energizing delay timer 1TR through line 171 and 172. The delay timer 1TR then times for a preset period and then actuates lines 123 and 124 to cause Control A in any desired conventional manner to apply the brake portion and disengage the clutch portion of the mechanism 18, to stop the rotation of the workpiece 11 at a selectable point following the identification of the seam 14.

The position of the workpiece, when it stops, is easily controlled by adjusting the delay time of the timer 1TR so that, for example, ears can be welded to the side of a workpiece in the proper place.

Because the stopping point of the workpiece is based on a constant rate of rotation, it is desirable that the detection portion 162 of sensing circuit 160 detects only after the workpiece has been accelerated up to a constant preselected speed. It therefore is preferred to provide the contact 8CR in series with contact S3R in FIG. 8 and closure by the means 175, in FIG. 1, when the latter has determined in a conventional manner that the workpiece has reached its normal rotational speed. The resulting closure of the contact 8CR enables operation of the detection portion 162 of the circuit 160 in the manner above-described.

Thereafter, the Control B will send a signal to the valve B to energize the power cylinder 91 at the welding station 81 through the terminals M–N to pivot the platform 82 upwardly to locate the backup member 87 on the terminal surface of the workpiece 11 and position the welding electrodes 97 and 98 adjacent to but spaced from the external surface of the workpiece 11. An attachment W will now be fed from the feeder 107 down the track 108 into juxtaposition with the welding electrodes 97 and 98 as illustrated in FIGS. 3 and 6. The Control B then actuates the valve B to energize the power cylinder 93 through the terminals X–Y to move the welding electrodes 97 and 98 toward the workpiece 11 to clamp the attachment W between the welding electrodes 97 and 98 and the external surface of the workpiece 11. The force of the welding electrodes 97 and 98 against the external surface of the workpiece 11 is offset by the backup member 87 on the opposite side of the wall of the workpiece 11.

The Control B then sends a signal to the weld control 106 (FIG. 6) to cause the source 104 to energize the welding transformer 103 to supply welding current through the welding electrodes 97 and 98 and the flanges 109 and 110 whereby a weld or fusion will be produced in the usual manner by the heat obtained from the resistance to the flow of electric current through the flanges 109 and 110 of the attachment W and the wall of the workpiece 11 held together under pressure by the electrodes 97 and 98 and the backup member 87.

Since in most instances, a pair of attachments are to be secured to the workpiece 11, at the completion of the first weld described above, the Control B will actuate the valve B to energize the power cylinder 93 to retract the welding electrodes 97 and 98 away from the external surface of the workpiece and the attachment W. Simultaneously therewith, the Control B sends a signal to the Control A, for example through line 183, to again energize the clutch portion of the clutch and brake mechanism 18 and de-energize the brake portion to initiate a further rotation of the workpiece 11. This rotation can be timed. It is preferred, however, that a second sensing device (not illustrated but preferably identical to the sensing device 39) can be provided for detecting the presence of the welded seam 14 but at a different location, preferably 180° from the location of the sensing device 39.

In such a double sensing device arrangement, neither sensing device would of course be diametrically opposed to the rotational drive elements 27 and 37, as shown for the sake of convenience in illustration in FIGS. 1 and 2. Rather, the diameter of the workpiece connecting the two sensing devices would be angled in a convenient manner from both the welding station and the rotational drive apparatus 27, 37. As a result, the diametrically externally opposite side of the workpiece 11 will be presented to the welding station 81 and a welding of another attachment W to the opposite side of the workpiece 11 is consummated. The welded procedure is the same as is described above and further detailing thereof is believed unnecessary.

Of course, if preferred, and particularly if a separate welding station is provided so as to make the necessary space available, it is feasible to provide two welding units positioned as desired, opposite each other where pail ears are involved, which can operate simultaneously from common controls to weld two ears in place at the same time. Alternatively, the electrode set 97, 98 in such arrangement, contacting one ear, may be connected to one side of welding transformer secondary 102 and the corresponding electrode set contacting the other ear on the opposite side of the pail may be connected to the other end of secondary 102, so that weld current flows from one ear and electrode set to the other electrode set and ear through the pail, each electrode set being constructed as shown or as a single electrode contacting both sides of the adjacent ear.

At the completion of the welding operation, the Control B actuates the valve B to energize the power cylinders 91 and 93 to simultaneously retract the welding electrodes 97 and 98 and to pivot the platform 82 downwardly to permit a removal of the workpiece from the orientation and welding station 13 to permit a further processing thereof. Simultaneously therewith, the Control A will effect a retraction of the drive roller 27 from the rolled rim 28 and extension of the cylinder 48 to separate the roller elements 46 and 47 so that upon a retraction of the rod 32 of the power cylinder 31 to lower the platform 36, the roller elements 46 and 47 will bypass the rolled rim 28. Thus, the workpiece 11 can be moved on the conveyor 12 to the next work station and another workpiece 11 can be presented to the orientation and welding station 13 whereupon the above-described process of orienting and welding can be performed again.

The energization of the cylinder 48 for extension by the valve A correspondingly opens the contact 5CR of FIG. 8 which resets the sensor ready portion 161 and thereby ensures resetting of the detection portion 162 of sensing circuit 160.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. Apparatus for welding an attachment onto an elongated, hollow workpiece having a welded seam thereon extending longitudinally parallel to the axis thereof, comprising:
    welding electrode means movable into and out of engagement with said workpiece;
    dispensing means for dispensing said attachment to be welded to said workpiece into close proximity to said welding electrode means;
    orientation means for moving and orienting said hollow workpiece relative to said welding electrode means;
    sensing means responsive to the wall thickness of said workpiece for detecting said welded seam and including a scissors-like pair of relatively pivoted arms, engaging means on said arms for receiving the wall of said workpiece therebetween, opposed electrical contact means on said arms and spaced further from the pivot axis of said arms than said engaging means for producing a signal in response to the presence at said welded seam between said engaging means;
    sensing circuit means responsive to said signal for stopping said orientation movement of said hollow workpiece with said welded seam in a selected angular relationship to said welding electrode means, then for relatively engaging said welding electrode means, attachment and workpiece, and thereafter for welding said attachment to said workpiece.

2. Apparatus according to claim 1, wherein said engaging means and contact means are spaced oppositely from said arm pivot axis, the range of movement of said contact means being substantially a multiple of the range of movement of said engaging means, so that a variation in workpiece wall thickness at said welded seam results in a multiplied deflection of said contact means.

3. Apparatus according to claim 1, wherein said pair of relatively pivotable arms cross and are connected intermediate their ends in scissors fashion by a pivot element, said engaging means comprising a roller element rotatably secured to each said arm, said roller elements being opposed to each other and engageable with the workpiece on opposite sides of the wall thereof, said sensing means including means alternatively actuable for separating said roller elements and for normally urging said roller elements toward each other, said electrical contact means comprising opposed contacts on said arms, said pivot element being located between said contacts and said rollers, said rollers being spaced substantially at the thickness of said hollow workpiece wall away from said seam when said contacts abut, said contacts defining a switch responsive to increased separation of said roller elements by said welded seam for opening and thereby carrying out said signaling of said sensing circuit means.

4. Apparatus according to claim 1, in which said sensing means include roller elements on said arms and a pressure fluid cylinder and means coupling same to said arms for spreading said roller elements apart to receive the workpiece wall therebetween and alternatively for urging said roller elements with a preselected, resiliently maintained force toward each other in sandwiching relation with the wall of said workpiece.

5. Apparatus according to claim 4 in which said workpiece is supported for rotation, said pressure fluid cylinder being carried by said arms, and including means pivotally supporting said arms for permitting said arms and pressure fluid cylinder to pivotally float as a unit toward and away from the workpiece axis in response to eccentricity of portions of the workpiece wall rotating therepast.

6. Apparatus according to claim 1 in which said orientation means includes means for radially locating said workpiece, said locating means supporting said pivot element in fixed location thereon, limit means on said locating means and engageable with said arms for limiting separating pivotable movement thereof, said limit means including at least one adjustable member engageable with one of said arms.

7. Apparatus according to claim 1, in which said arms are pivoted scissors fashion on an intermediate pivot element, and including reciprocable power means interconnecting said arms intermediate said pivot and one of said engaging means and contact means for spreading said engaging means to allow loading and unloading of said workpiece therebetween and for alternatively urging said engaging means into gripping relation with the wall of said workpiece with a preselected resilient force of magnitude allowing increased separation of said engaging means upon intervention of a seam on said workpiece therebetween.

8. Apparatus according to claim 7, in which said engaging means are located adjacent one end of said arms, said contact means are located adjacent the other end of said arms and at least at substantially twice the distance from said pivot as said engaging means, said power means being located on said arms between said pivot and said contact means and at about the same distance from said pivot as said engaging means.

9. Apparatus according to claim 8, in which said power means includes a pressure fluid cylinder extending substantially transversely of one of said arms and spaced from said pivot element, a bracket on said one arm pivotally mounting said fluid cylinder thereon, and means pivotally securing the piston rod of said cylinder to the other of said arms.

10. Apparatus according to claim 9, including valve means responsive to said orientation means for energizing said cylinder with a resilient fluid at a preselected pressure to achieve said gripping of said workpiece wall by said engaging means, means responsive to such energization of said cylinder by said valve means for applying operating potential to said sensing circuit means, and means for causing reversal of said energization of said fluid cylinder.

11. The apparatus of claim 1, wherein the orientation means and the welding means located at a common work station are operable sequentially with the workpiece at said work station and including a fluid power device for urging said engaging means against said workpiece.

12. Apparatus according to claim 1, in which said sensing circuit means includes a sensor-ready portion and a detection portion responsive to said sensor-ready portion, said sensor-ready portion including electronic switch means and means reducing the effect of contact resistance on circuit resistance for connecting said electronic switch means to said contact means in a manner that closure of said contact means upon engagement of said engaging means with said workpiece wall causes said electronic switch means to shift from a first state to a second state, means interconnecting said sensor-ready portion to said detection portion and responsive to opening of said contact means for actuating said detection portion, and means connecting said detection portion to said orientation means for stopping movement of said hollow workpiece in proper orientation with respect to said welding electrode means.

13. Apparatus according to claim 12, in which said electronic switch means includes a first transistor responsive to closure of said contact means for conducting, an SCR conductive in response to conduction of said first transistor, a second transistor conductive in response to conduction of said SCR and held conductive thereby despite a later deactivation of said first transistor, and a relay energizable in response to conduction of said second transistor, said relay having a contact in said detection portion for preventing operation of said detection portion until after said relay is energized, said sensor-ready portion further including filter means connecting to said first transistor for reducing the effect of contact bounce of said contact means on said first transistor.

14. Apparatus as defined in claim 13, in which said first transistor connects to said detection portion for causing said detection portion to operate upon opening of said contact means, said detection portion including a further SCR, an RC filter in the gate circuit and said further SCR and connected to said first transistor and to a source of operating potential for preventing false triggering of said further SCR in response to transients in said source of operating potential, a further relay in said detection portion responsive to the conduction of said further SCR for stopping said movement of said workpiece, a third transistor interconnecting said further SCR and further relay, and means preventing damage to second and third transistors by reverse conduction through said first mentioned and further relays upon de-energization thereof.

* * * * *